(12) United States Patent
Iarochenko et al.

(10) Patent No.: US 6,469,420 B2
(45) Date of Patent: Oct. 22, 2002

(54) PIEZOELECTRIC MOTOR

(75) Inventors: Alexander M. Iarochenko, Toronto (CA); V'Yacheslav V. Lavrinenko, Kiev (UA)

(73) Assignee: Eontech Group Inc., Ontario (CA)

( * ) Notice: Subject to any disclaimer, the term of this patent is extended or adjusted under 35 U.S.C. 154(b) by 0 days.

(21) Appl. No.: 09/917,214

(22) Filed: Jul. 30, 2001

(65) Prior Publication Data

US 2002/0017831 A1 Feb. 14, 2002

(30) Foreign Application Priority Data

Aug. 3, 2000 (CA) ............................................. 2315013

(51) Int. Cl.$^7$ .............................................. H01L 41/08
(52) U.S. Cl. .................................................. 310/323.02
(58) Field of Search ........................ 310/323.02, 323.03, 310/323.04, 323.05, 323.08

(56) References Cited

U.S. PATENT DOCUMENTS

| 4,019,073 A | * | 4/1977 | Vishnevsky et al. | ... 310/323.02 |
| 4,400,641 A | * | 8/1983 | Vishnevsky et al. | ... 310/323.02 |
| 4,453,103 A | | 6/1984 | Vishnevsky et al. | |
| 4,959,580 A | | 9/1990 | Vishnevsky et al. | |

FOREIGN PATENT DOCUMENTS

| JP | 05049271 | 2/1993 |
| SU | 1820820 | 2/1998 |

* cited by examiner

*Primary Examiner*—Mark O. Budd
(74) *Attorney, Agent, or Firm*—Jeffrey S. Melcher; Manelli Denison & Selter, PLLC (57) ABSTRACT

A piezoelectric motor having a stator and a rotor. The stator and the rotor are in mechanical contact with one another along at least one cylindrical friction surface by means of curved, elastic and longitudinally elongated pusher plates, the pusher plates being held against the friction surface at a first end of the pusher plates, and arranged at an angle to the friction surface. A piezoelectric element is connected to either the rotor or the stator. The piezoelectric element has electrodes placed on opposing surfaces of the piezoelectric element, and is connectable to an alternating current source via the electrodes for providing longitudinal oscillations in the piezoelectric element. A first ring plate and a second ring plate are arranged on opposite sides of the piezoelectric element, so that at least a portion of surfaces of the piezoelectric element are pressed against surfaces of the first ring plate and the second ring plate, respectively, by a clamping device. Longitudinal oscillations are thus transferred into the first ring plate and the second ring plate from the piezoelectric element, and at least one of the first ring plate and the second ring plate are in mechanical contact with second ends of the pusher plates.

25 Claims, 4 Drawing Sheets

PIEZOELECTRIC MOTOR

BACKGROUND OF THE INVENTION

1. Field of the Invention

The invention relates to piezoelectric devices and, more specifically, piezoelectric motors, being electric motors using piezo crystals for providing rotational momentum to a rotor part of the motor relative a stator part of the motor.

2. Description of the Prior Art

A piezoelectric motor is known from U.S. Pat. No. 4,453,103, granted Jun. 5, 1984, comprising a stator and a rotor, which are in mechanical contact with one another along at least one cylindrical surface of friction interaction. Elastically curved, longitudinally elongated plates/pushers, which are set against the friction surface at one end, and are positioned at an angle to the same surface, while being anchored at the other end, either directly or via a metal membrane, to the cylindrical surface of the ring piezoelectric element with electrodes for exciting longitudinal oscillations of the perpendicular surfaces of friction interaction.

A piezoelectric motor (U.S. Pat. No. 4,959,580, granted Sep. 25, 1990) is also known, possessing the same attributes, except that the pushers are at one end anchored on the flat surface of the ring piezoelectric element.

The maximum power which can be supplied to the piezoelectric element of the above motors is determined by the maximum breaking strength of the piezoelectric element or the strength of the bond between the electrodes of the piezoelectric element coating and the ceramics, when the pushers are anchored on the piezoelectric element's surface. A small diameter of the piezoelectric element will not allow a large number of pushers to be anchored in order to increase the motor's torque moment. Solving the above problems requires increasing the diameter of the piezoelectric element and, consequently, the piezoelectric element's volume, which significantly increases the motor's size and cost. The presence of recesses in the piezoelectric element and the thermal shocks that the piezoelectric ceramics is subjected to when the pushers' connections are being soldered on it, notably reduces the motor's reliability, especially in the modes of operation approaching the limit of tolerance. Moreover, such is the technology of anchoring pushers that it requires sizable expenditures when each new type of motor is introduced to the manufacturing process.

SUMMARY OF THE INVENTION

The main purpose of the invention is to provide a piezoelectric motor designed so that it would be possible to avoid direct connection between the pusher and the piezoelectric element.

It has been shown that if two flat ring plates are pressed against the surface plate of the piezoelectric element by means of a clamp, the plates together with the piezoelectric element will form a new oscillation system. The quality factor of the first resonance oscillation mode is not lower (and at times higher) than that of the first mode of the ring piezoelectric element, with the resonance characteristics remaining monofrequency, i.e. acting as a single whole in regard to the oscillations of the piezoelectric element with the plates, but, since the piezoelectric element is drafted, its rupture strength increases. Besides, the motor's reliability and the maximum value of its pulse power also increase. The number of pushers can now be vastly augmented, as well as the motor's starting torque. All this is achieved with the minimum amount of piezoelectric ceramics and at but insignificant costs of technological rigging.

In the invention, a piezoelectric motor comprises a stator and a rotor, the stator and the rotor being in mechanical contact with one another along at least one cylindrical friction surface by means of curved, elastic and longitudinally elongated pusher plates. The pusher plates are held against the friction surface at a first end of the pusher plates, and arranged at an angle to the friction surface. Further, a piezoelectric element is connected to the rotor, according to a first embodiment of the invention. The piezoelectric element has electrodes placed on opposing surfaces of the piezoelectric element, and is connectable to an alternating current source via the electrodes, for providing longitudinal oscillations in the piezoelectric element. A first ring plate and a second ring plate are arranged on opposite sides of the piezoelectric element, so that at least a portion of surfaces of the piezoelectric element are pressed against surfaces of the first ring plate and the second ring plate, respectively, by a clamping device. In this way, longitudinal oscillations are transferred into the first ring plate and the second ring plate from the piezoelectric element. At least one of the first ring plate and the second ring plate are in mechanical contact with a second end of the pusher plates.

Three alternative methods of attaching the pusher plates to the ring plates are preferred for the first embodiment of the invention:

1) The pusher plates are anchored on the first ring plate at the second end of the pusher plates.
2) The pusher plates are anchored on the second ring plate at the second end of the pusher plates.
3) A first set of the pusher plates are anchored on the first ring plate at the second end of the first set of pusher plates and a second set of the pusher plates are anchored on the second ring plate at the second end of the second set of pusher plates.

Preferably, the clamping device is sound-insulated from at least one of the first ring plate and the second ring plate by means of a soundproofing device. The soundproofing device is advantageously made of a soundproof material, for example rubber. The soundproofing device may further be made in the form of a thin-walled cylindrical membrane.

The electrodes of the piezoelectric element are either applied to flat surfaces of the piezoelectric element or applied to cylindrical surfaces of the piezoelectric element.

The pusher plates are advantageously anchored with a first end in recesses in the piezoelectric element by drafting the recesses.

The rotor is advantageously in the shape of a barrel enclosed by the pusher plates. Alternatively, the rotor is in the shape of a cylinder enclosed by the pusher plates.

Advantageously, either the stator or the rotor switches on the piezoelectric element. Preferably, the transfer of longitudinal oscillations into the first ring plate and the second ring plate from the piezoelectric element takes place via sound-conductive gaskets arranged between the piezoelectric element and the first ring plate and the second ring plate, respectively.

A second embodiment of the invention is a piezoelectric motor comprising a stator and a rotor, the stator and the rotor being in mechanical contact with one another along at least one cylindrical friction surface by means of curved, elastic and longitudinally elongated pusher plates. The pusher plates are held against the friction surface at a first end of the pusher plates, and arranged at an angle to the friction surface. A piezoelectric element is connected to the stator, the piezoelectric element having electrodes placed on opposing surfaces of the piezoelectric element, the piezoelectric element being connectable to an alternating current source via the electrodes for providing longitudinal oscillations in the piezoelectric element. Further, a first ring plate and a second ring plate are arranged on opposite sides of the piezoelectric element, so that at least a portion of surfaces of the piezoelectric element are pressed against surfaces of the first ring plate and the second ring plate, respectively, by a clamping device. In this way, longitudinal oscillations are transferred into the first ring plate and the second ring plate from the piezoelectric element, the pusher plates being anchored on the rotor at a second end of the pusher plates.

Seven alternative methods of attaching the pusher plates to the ring plates are preferred for the second embodiment of the invention:

1) The pusher plates are anchored on the rotor on the first ring plate, for cooperation between the first end of the pusher plates and an inner circumferential surface of the first ring plate.
2) The pusher plates are anchored on the rotor on the second ring plate, for cooperation between the first end of the pusher plates and an inner circumferential surface of the second ring plate.
3) A first set of pusher plates are anchored on the rotor on the first ring plate, for cooperation between the first end of the first set of pusher plates and an inner circumferential surface of the first ring plate, and a second set of pusher plates are anchored on the second ring plate for cooperation between the first end of the second set of pusher plates and an inner circumferential surface of the second ring plate.
4) The diameter of the first ring plate is smaller than a diameter of the second ring plate, and the pusher plates are anchored on the inner circumferential surface of the first ring plate.
5) The diameter of the second ring plate is smaller than a diameter of the first ring plate, and the pusher plates are anchored on the inner circumferential surface of the second ring plate.
6) The diameter of the first ring plate is larger than a diameter of the second ring plate, and the pusher plates are anchored on the inner circumferential surface of the first ring plate.
7) The diameter of the second ring plate is larger than a diameter of the first ring plate, and the pusher plates are anchored on the inner circumferential surface of the second ring plate.

Preferably, the clamping device is sound-insulated from at least one of the first ring plate and the second ring plate by means of a soundproofing device. Advantageously, the soundproofing device is made of a soundproof material, for example rubber. Advantageously, the soundproofing device is made in the form of a thin-walled cylindrical membrane.

The electrodes of the piezoelectric element are applied either to flat surfaces of the piezoelectric element or to cylindrical surfaces of the piezoelectric element.

Preferably, the pusher plates are anchored with a first end in recesses in the piezoelectric element by drafting the recesses.

Advantageously, the rotor is in the shape of a barrel enclosed by the pusher plates. Alternatively, the rotor is in the shape of a cylinder enclosed by the pusher plates.

Preferably, the stator or the rotor switches on the piezoelectric element.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE INVENTION

Figure 1:
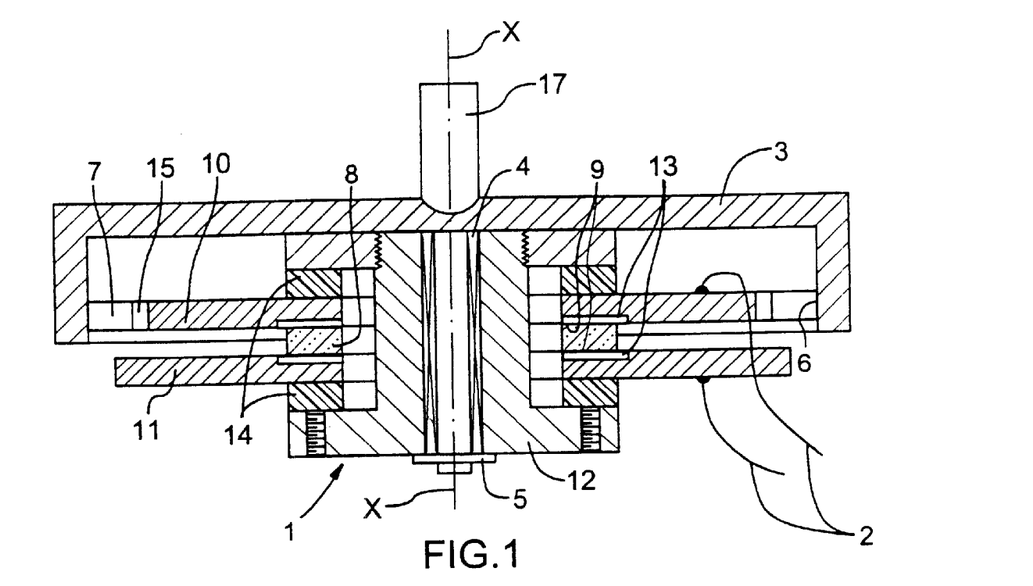
FIG. 1 is a sectional side view of a piezoelectric motor according to a first embodiment of the invention, showing plates pressed against the piezoelectric element's surface.

The piezoelectric motor contains a stator 1 (as shown in FIG. 1) with leads 2 for connecting to an AC voltage source (not shown). The stator is the stationary part of the piezoelectric motor relative to the unit (not shown) where it is mounted. A rotor 3 of the piezoelectric motor is mounted on the stator 1 so the rotor can rotate in a bearing 4 and is fixed to avoid axial motion by a detachable joint 5, for example a lock washer. The rotor is fixedly attached to an output shaft 17, which rotates together with the rotor and thus provides the rotational motion generated by the piezoelectric motor. The longitudinal axis of the output shaft is designated X in FIG. 1.

The stator 1 and the rotor 3 are in mechanical contact with one another on a cylindrical friction interaction surface 6 by means of curved, elastic and longitudinally elongated pusher plates 7, which are positioned at an angle to the friction surface 6. The pusher plates are preferably substantially rectangular and as a rule have a uniform thickness, to facilitate the manufacturing process. The pusher plates 7 are contacting the friction surface 6. The stator 1 includes a ring piezoelectric element 8 with electrodes made of a piezoelectric material. This also implies that, alternatively, the motor may be rigidly anchored on the rotor, which will mean that, in essence, the stator and the rotor will exchange places, and the above piezoelectric element 8, just as the rotor's other parts, will become part of the rotor.

The piezoelectric element 8 is located between a first ring plate 10, on which the pusher plates 7 are anchored with an anchor ring 15, and a second ring plate 11, acting as a counterpoise in order to prevent excitation of curve oscillations in the piezoelectric element with the first plate 10, and thus avoid losses in mechanical energy. The first ring plate 10 and the second ring plate 11 are substantially parallel to each other.

The first ring plate 10 and the second ring plate 11 are, furthermore, pressed against the surface of the piezoelectric element 8 by a clamp 12, for example a steel bolt with a nut.

In order to protect the piezoelectric element from being damaged when the nut is tightened, thin gaskets 13 made of a sound-conductive material, for instance aluminum, are installed between the piezoelectric element 8 and the first ring plate 10 and the second ring plate 11, respectively.

A distinctive feature of the design of the motor shown in FIG. 1 is that longitudinal radial oscillations are excited in the piezoelectric element from the source (not shown) when the electrodes 9 are connected to the source by means of the leads 2, virtually without any losses. This is due to the presence of the counterpoise second ring plate 11. The piezoelectric element 8, the first ring plate 10 and the second ring plate 11 form a single oscillatory system of radial oscillations with a resonance frequency determined by the size of not only the piezoelectric element but also the ring plates 10 and 11, respectively.

To prevent that a part of the acoustic energy branches into the clamp, the clamp is sound-insulated from the first ring plate 10 and the second ring plate 11 by means of sound-proofing devices 14. The soundproofing devices are preferably made in the form of rubber washers separated from the bolt head and the nut by steel washers.

In the design of the engine shown in FIG. 1, the pusher plates 7 are anchored at one end on the exterior of the first ring plate 10. The other end of the pusher plates 7 is supported by the cylindrical friction surface 6 of the rotor 3, with the rotor being in the form of a barrel enclosing the pusher plates 7.

Figure 2:
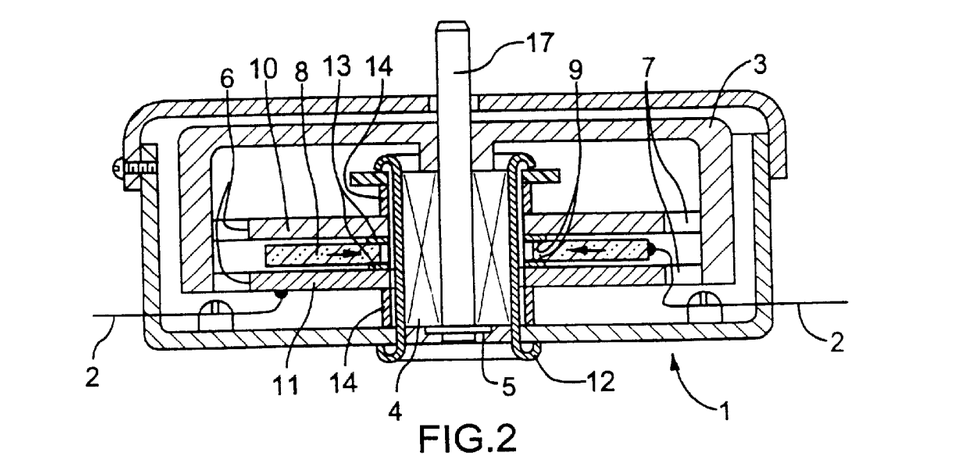
FIG. 2 is a sectional side view of a piezoelectric motor according to a second embodiment of the invention, showing pushers anchored on the rotor in the shape of a barrel.

In the design of the engine shown in FIG. 2, the rotor 3 also has a part in the form of a barrel, and the pusher plates 7 are at one end anchored on the walls of the barrel part of the rotor, and are supported at the other end by the cylindrical surface of the first ring plate 10, which is the friction interaction surface 6 in this embodiment. The diameter of the friction interface surface is approximately 2 pusher plate lengths shorter than the diameter of the cylindrical surface of friction interaction of the motor shown in FIG. 1 and, consequently, the rotational speed of the motor with pusher plates positioned on the rotor (FIG. 2) is higher than that of the motor with pusher plates anchored on the plate (FIG. 1). Still shorter is the rotor diameter of the motor with pushers positioned on the rotor 3 and supported by the interior cylindrical surface of the first ring plate 10, which is illustrated in FIG. 3a.

Figures 3A, 3B:
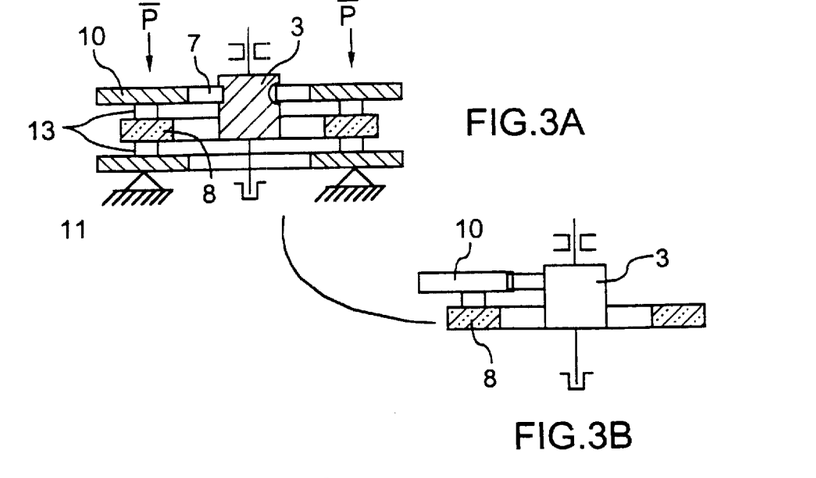
FIG. 3a is a schematic diagram of a motor according to the invention, showing pushers anchored on the plate's internal cylindrical surface.
FIG. 3b is a schematic diagram of a motor according to the invention, showing pushers set with one end against the plate's internal cylindrical surface.

Maximum rotational speed is reached in the motor where the pushers are anchored on the interior cylindrical surface of the plate 10 (FIG. 3b). The rotor 3, enclosed by the pusher plates, is made in the shape of a cylinder.

Using motors as described above, with different options for positioning and anchoring pusher plates, rotation engines can be designed having rotation speeds starting from several rotations per minute and up to 1000 rpm and having starting torques from 20 Hm to 0.01 Hm.

Figure 3C:
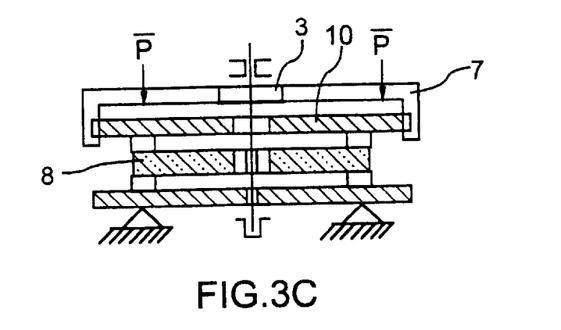
FIG. 3c is a schematic diagram of a motor according to the invention, showing L-shaped pushers.

For low-power, high-rotation motors with a small inner orifice of the piezoelectric element, pusher plates are preferably made in an L-shape and anchored on the exterior cylindrical surface of the first ring plate 10, as shown in FIG. 3c.

An essential distinctive feature of piezoelectric motors with the pusher plates 7 anchored on the first ring plate 10 is the fact that the external diameter of the counterpoise second ring plate 11 is larger for the embodiment where the rotor 3 is enclosing the pusher plates (FIG. 1), than the diameter of the first ring plate 10 with anchored pusher plates.

The larger the number of pusher plates, the larger the difference in the diameters should be. The required ratio of the plate diameters is selected experimentally by the following method.

Figure 4A:
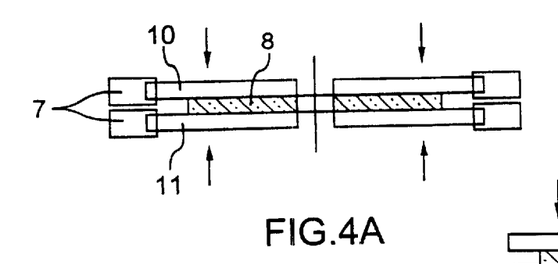
FIG. 4a is a schematic diagram of a piezoelectric element according to the invention, showing two plates pressed against the element with pushers anchored on the plates.
Figure 4B:
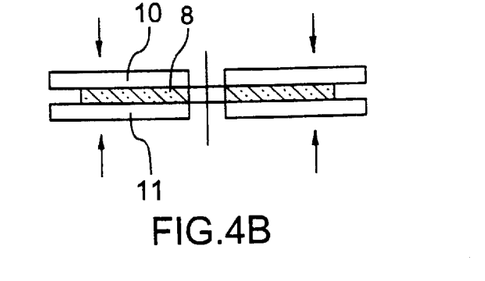
FIG. 4b is a schematic diagram of a piezoelectric element with two plates pressed against it.

A rotation system is assembled, where the counterpoise second ring plate is replaced by a plate with pusher plates, as shown in FIG. 4a. The resonance frequency of the oscillation mode which is chosen to be the working one (e.g. Mode 1 of radial oscillations, i.e. $1^{st}$ order resonance frequency) is measured by known methods. Then, a second rotation system is assembled out of counterpoise second ring plates (FIG. 4b). By changing the external diameter of the counterpoise ring plate, it is possible to achieve equal resonance frequencies of the working oscillation mode.

In a similar manner, if the pusher plates are anchored on the interior cylindrical surface of the first ring plate 10 (FIG. 2), then, in order to match resonance frequencies, it will necessary to increase the external diameter and/or reduce the internal diameter of the counterpoise second ring plate 11, using the method described above.

Normally, longitudinal radial oscillation Mode 1 is selected as the working mode. However, in case of powerful motors, radial oscillation Mode 1 can be in the acoustical frequency range. In such an event, the working mode is selected as longitudinal resonance oscillation mode M, depending on ring width. This design is illustrated in FIGS. 3a and 3b.

The engine's parameters are largely determined by the selected area of the surface of contact between the piezoelectric element 8 and the first ring plate 10 and the second ring plate 11. In the simplest case, the whole flat surface of the piezoelectric element is used for the acoustic contact between the piezoelectric element and the first ring plate and the second ring plate. Energy losses due to friction in this event are maximal, since the oscillation rates of the points of contact between the plates and the piezoelectric element are unequal. In order to avoid such losses, the soundproofing gasket 13 is advantageously made in the form of a narrow ring and positioned at the edges of the piezoelectric element (FIGS. 2 and 3c) or in its center, depending on the oscillation mode.

The motor's parameters depend largely on the choice of soundproofing devices 14, as well. In the event that there are no rigid requirements to the motor's height, the soundproofing devices 14 are preferably made in the form of thin-walled cylinders, as shown in FIG. 2.

Figure 5A:
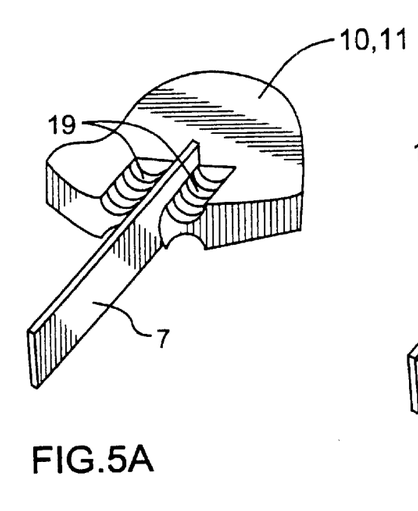
FIG. 5a shows an alternative way of anchoring a pusher on the plate.

In the event that the pusher plates 7 are anchored at one end on the first ring plate 10, the method of anchoring the pushers becomes vitally important for the motor's parameters. In certain technological approaches, the pushers are anchored in slots (recesses) 18 (see FIGS. 6A to 6C), arranged at the periphery of the first ring plate, by means of glue compounds or lead-and-tin solders, for example. A distinctive feature of the technological approach discussed here is that the pusher plates 7 are at one end anchored in the slots 18 of the first ring plate 10 by means of drafting the slot, up to its closing with additional stress acting on the pusher plate from the direction of the slot walls (FIGS. 5a and 5b), forming plate holding wells 19.

Figure 5B:
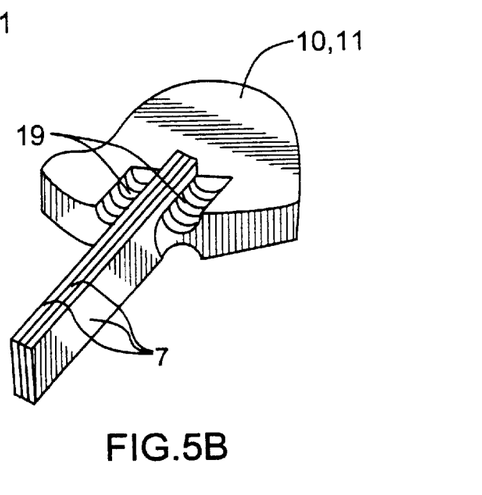
FIG. 5b shows an alternative way of anchoring a plurality of pushers together on the plate.
Figure 6A:
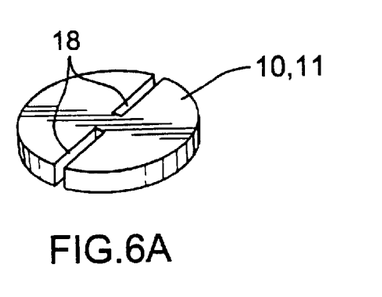
FIG. 6a shows a disk with deep slots.
Figure 6B:
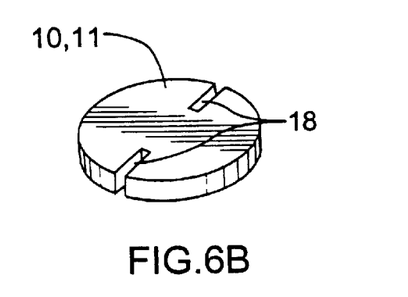
FIG. 6b shows a disk with medium depth slots.
Figure 6C:
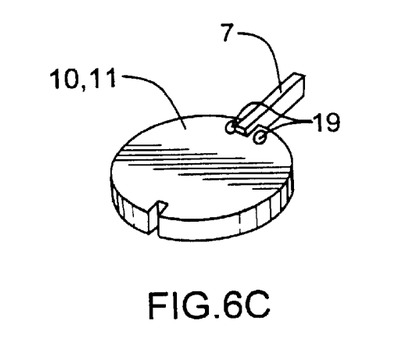
FIG. 6c shows a disc with shallow slots.

According to this method, one or more pusher plates 7 can be anchored in one slot 18 as illustrated by FIG. 5b. Three pusher plates are shown arranged in one slot, but any desirable number may be used, for example 2, 4, 5, 6, 7, 8, 9, 10 etc.

A resonator 10, 11 with a deep slot 18 (FIG. 6a) has virtually no radial oscillation mode. A resonator with a medium-deep slot 18 (FIG. 6b) has a number of resonances, radial oscillation mode among them. In a resonator with a shallow slot 18 (FIG. 6c), the radial oscillation mode has two nearly similar resonance frequencies, each of which draws energy away from the adjacent oscillation mode. Filling the slots with a compound or solder does nothing to eliminate this phenomenon. Anchoring the pushers by drafting the slot, forming plate holding wells 19, leads to the matching of resonance frequencies, which manifests itself in the motor by a decrease in the phase shift between the current and the voltage at the motor's inlet.

Figure 7A:
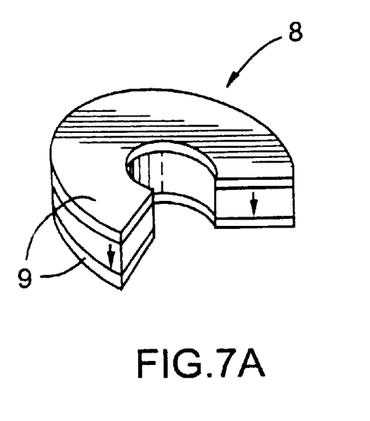
FIG. 7a shows a piezoelectric element with electrodes on the flat surfaces of the element.

The excitation of longitudinal elastic vibrations (waves) in the first ring plate 10 and the second ring plate 11 becomes possible due to the fact that the piezoelectric element has the form of a ring, preferably made of a polarized piezoelectric ceramic material with electrodes on its on sides. In a first embodiment of the piezoelectric element shown in FIG. 7a, the electrodes 9 are applied (e.g. by spraying) onto the piezoelectric element's flat surfaces. In the second embodiment shown in FIG. 7b, the electrodes 9 are applied onto the cylindrical surfaces of the piezoelectric element 8. For both of the above embodiments, the polarization of the piezoelectric ceramic is achieved by high voltages applied to the electrodes. The direction of polarization is shown on the figures by arrows, and matches the direction of the polarizing voltage.

An important characteristic of a motor is its torque (resource). A motor's torque (resource) largely depends on the material used for the friction surface and the portion of the pusher plate which comes in contact with the friction surface. Steel is the material used in relatively inexpensive engines for the friction surface and the pusher plates. In order to increase the resource, a coating of chrome or another super-hard material is applied to the steel in the zone of mechanical contact. Sometimes, formaldehyde resin based materials or aluminum oxide ceramics are selected as the contact materials.

The starting torque of a piezoelectric motor increases proportionally to the increase in the number of pusher plates used. The known methods of anchoring the pusher plates on the piezoelectric element do not guarantee a high reliability of the motor, because during fixation of each new pusher plate there is a possibility of the piezoelectric element or its electrodes collapsing, cracking or otherwise getting damaged. In the technological approach described here, on the other hand, the motor's reliability and torque (resource) increase with the increase of the number of pushers, and as far as the influence of the one pusher plate in overall mass of the pusher plates it insignificantly affects the motor's parameters. Furthermore, the pusher plates themselves are arranged outside of the piezoelectric element and its electrodes.

In motors with pusher plates 7 anchored on a steel rotor, where a piezoelectric element 8 having electrodes on the cylindrical surfaces is used, the number of pusher plates can be doubled by using the cylindrical surface of the second ring plate 11 as the second surface of friction interaction (FIG. 2). As has been noted before, the rotor and stator can switch places. This sometimes allows a notable simplification of the motors design (FIG. 8), since, when the once mobile rotor 3 becomes a stator, it acts as the protective housing a motor is usually supplied with (see, for instance, the motor shown in FIG. 2). Such motors are called converted in this text.

In such an event, one of the leads 2 is connected to the motors stator, and the other lead, via a sliding contact and metal second ring plate 11, to the electrode 9 of the piezoelectric element 8. The claimed piezoelectric motor operates as follows. The supply voltage from a power source having a frequency equal or close to one resonance frequency of longitudinal radial vibration of the system containing the piezoelectric element 8, the first ring plate 10, the second ring plate 11 and the pusher plates 7, is connected to the piezoelectric element 8 through the leads 2 and electrodes 9 (see FIG. 1). The piezoelectric element will compress and expand under the applied A.C. voltage, generating a longitudinal traveling wave of the expansion/compression deformation. This wave does not develop further through the soundproofing gasket 13 and penetrates the first ring plates 10 the second ring plate 11 and, consequently, the pusher plates 7.

Reflected from the external cylindrical surfaces of the plates, the waves repeatedly return to the piezoelectric element 8, etc., and, reflected from the boundaries, form a standing wave of longitudinal radial oscillations, whose amplitude is Q times larger than the amplitude of the traveling wave (Q is the quality of the oscillation system).

The mechanical oscillations amplified by the resonance arrive at the pusher plates 7 and compel the pusher plates to oscillate longitudinally. The pusher plates, slanted towards the cylindrical surface and set against it, move both longitudinally and transversely. The transverse wave thus generated, phase shifted in relation to the longitudinal oscillation wave, forces the pusher plate ends to move along an elliptical trajectory, while, every time the pusher plates enter into engagement with the rotor (along the surface of friction engagement), they push the rotor 3 (FIG. 1), thus relaying to it the unidirectional motion impulse.

Oscillations of the first ring plate 10, the second ring plate 11 and the piezoelectric element 8 generate repulsion forces between them. The clamp 12 provides a clamping force which exceeds the repulsion forces. The damage hazard to the piezoelectric element is significantly reduced by the fact that the piezoelectric element is enclosed on either side. This is the reason the maximum pulse power of the motors described here is several times higher than that of the known motors, where the maximum pulse power is limited by the damage hazard to the piezoelectric element.

Using plain bearings 4, for example made out of porous oil-saturated bronze, guarantees the motor's long life, with the rotor 3 rotating in relation to the stator 1, while the lock washer 5 prevents axial motion of the rotor 3 in relation to the stator 1.

Figure 8:
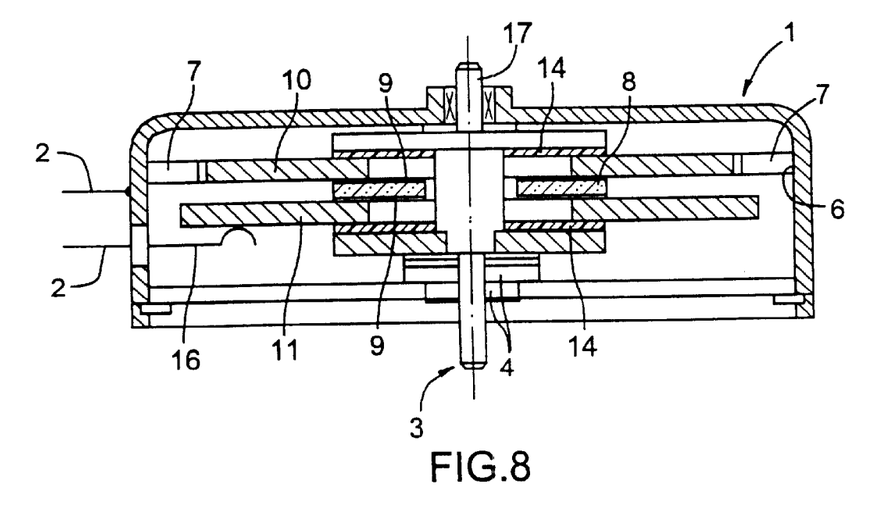
FIG. 8 shows a sectional side view of a third embodiment of a piezoelectric motor according to the invention, showing a motor of the so called converted type.

The functioning of the reverse motor shown in FIG. 8 is based upon a principle similar to the one described above, with the only difference being that electric energy is supplied to the piezoelectric element 8 from the leads 2 via the pusher plates 7 and a sliding contact 16. The moment of inertia of the rotor 3 of a converted engine is much lower than that of motors with a stationary piezoelectric element (see e.g. FIG. 1). That is why this motor has a higher quality as a positioner. Elastic radial oscillations of the external cylindrical surface of the first ring plate 10 and the second ring plate 11 (FIG. 2) cause the ends of the pusher plates 7 anchored on the rotor 3 to experience longitudinal and transverse displacements, as well. As a result, longitudinal and transverse (flexural) waves are generated in the pusher plates, which, being unbound acoustically and phase shifted, compel the pusher plate ends to move along an elliptical trajectory. Coming into contact with the cylindrical surface of the first ring plate 10 and the second ring plate 11, the pushers 7 pushing off, cause the rotor 3 to rotate (FIG. 2).

Figure 7B:
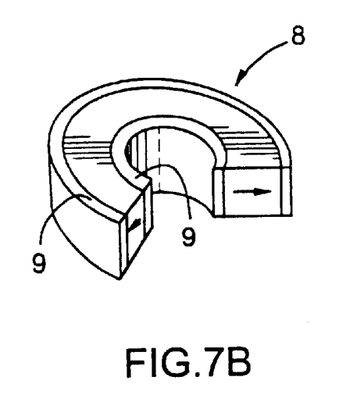
FIG. 7b shows a piezoelectric element with electrodes on the cylindrical surfaces of the element.

The motor described here uses a piezoelectric element with electrodes on cylindrical surfaces (FIG. 7b). If a piezoelectric element with electrodes is used on flat surfaces (FIG. 7a), it will be short-circuited by the pusher plates 7. The use in the motor of the clamp 12 in the form of a flared-out tube is but a technological peculiarity not affecting the motor's functioning in any way. Installing L-shaped pusher plates in each of the n-plate slots (FIG. 3c) has no serious effect, either. As for the flaring out of the pusher plates (FIGS. 5a to 6c), this, as has been noted before, renders the oscillation system mono-frequency, thus reducing the power angle.

A motor with a large diameter piezoelectric element used for achieving relatively high power values has a certain essential distinction. In such motors, the first ring plate 10 and the second ring plate 11 excite the longitudinal resonance of oscillation Mode 1 in the width direction of the plates. Placing the rotor 3 (FIG. 3a, b, c) inside the pusher plates, allows using aluminum oxide based mineral ceramic materials for the rotor manufacture, without a notable increase in the motor's cost.

The results of tests performed on a wide class of motor designs in regard to the technological approaches discussed above, have confirmed the expectations that the motors described here will have a number of advantages over the previously known motors. Those advantages include, above all, high reliability and convenience of use under the conditions of primitive automation.

It will be appreciated that the above description relates to the preferred embodiments by way of example only. Many variations on the invention will be obvious to those knowledgeable in the field, and such obvious variations are within the scope of the invention as described and claimed, whether or not expressly described.

What is claimed is:

1. A piezoelectric motor comprising:
    a stator;
    a rotor, said stator and said rotor being in mechanical contact with one another along at least one cylindrical friction surface by means of curved, elastic and longitudinally elongated pusher plates, said pusher plates being held against said friction surface at a first end of said pusher plates, and arranged at an angle to said friction surface;
    a piezoelectric element connected to said rotor, said piezoelectric element having electrodes placed on opposing surfaces of said piezoelectric element, said piezoelectric element being connectable to an alternating current source via said electrodes for providing longitudinal oscillations in said piezoelectric element; and
    a first ring plate and a second ring plate arranged on opposite sides of said piezoelectric element, so that at least a portion of surfaces of said piezoelectric element are pressed against surfaces of said first ring plate and said second ring plate, respectively, by a clamping device, for transferring longitudinal oscillations into said first ring plate and said second ring plate from said piezoelectric element, and at least one of said first ring plate and said second ring plate being in mechanical contact with a second end of said pusher plates, and wherein said transfer of longitudinal oscillations into said first ring plate and said second ring plate from said piezoelectric element takes place via sound-conductive gaskets arranged between said piezoelectric element and said first ring plate and said second ring plate, respectively.

2. A piezoelectric motor according to claim 1, wherein said pusher plates are anchored on said first ring plate at said second end of said pusher plates.

3. A piezoelectric motor according to claim 1, wherein said pusher plates are anchored on said second ring plate at said second end of said pusher plates.

4. A piezoelectric motor according to claim 1, wherein a first set of said pusher plates are anchored on said first ring plate at said second end of said first set of pusher plates and a second set of said pusher plates are anchored on said second ring plate at said second end of said second set of pusher plates.

5. A piezoelectric motor according to claim 1, wherein said clamping device is sound-insulated from at least one of said first ring plate and said second ring plate by means of a soundproofing device.

6. A piezoelectric motor according to claim 5, wherein said soundproofing device is made of a soundproof material.

7. A piezoelectric motor according to claim 6, wherein said soundproofing device is made of rubber.

8. A piezoelectric motor according to claim 5, wherein said soundproofing device is made in the form of a thin-walled cylindrical membrane.

9. A piezoelectric motor according to claim 1, wherein said electrodes of said piezoelectric element are applied to flat surfaces of said piezoelectric element.

10. A piezoelectric motor according to claim 1, wherein said electrodes of said piezoelectric element are applied to cylindrical surfaces of said piezoelectric element.

11. A piezoelectric motor according to claim 1, wherein said rotor is in the shape of a barrel enclosed by said pusher plates.

12. A piezoelectric motor according to claim 1, wherein said rotor is in the shape of a cylinder enclosed by said pusher plates.

13. A piezoelectric motor according to claim 1, wherein said stator switches on said piezoelectric element.

14. A piezoelectric motor according to claim 1, wherein said rotor switches on the piezoelectric element.

15. A piezoelectric motor comprising:
    a stator;
    a rotor, said stator and said rotor being in mechanical contact with one another along at least one cylindrical friction surface by means of curved, elastic and longitudinally elongated pusher plates, said pusher plates being held against said friction surface at a first end of said pusher plates, and arranged at an angle to said friction surface;
    a piezoelectric element connected to said stator, said piezoelectric element having electrodes placed on opposing surfaces of said piezoelectric element, said piezoelectric element being connectable to an alternating current source via said electrodes for providing longitudinal oscillations in said piezoelectric element; and
    a first ring plate and a second ring plate arranged on opposite sides of said piezoelectric element, so that at least a portion of surfaces of said piezoelectric element are pressed against surfaces of said first ring plate and said second ring plate, respectively, by a clamping device, for transferring longitudinal oscillations into said first ring plate and said second ring plate from said piezoelectric element, said pusher plates being anchored on said rotor at a second end of said pusher plates and wherein said transfer of longitudinal oscillations into said first ring plate and said second ring plate from said piezoelectric element takes place via sound-conductive gaskets arranged between said piezoelectric element and said first ring plate and said second ring plate, respectively.

16. A piezoelectric motor according to claim 15, wherein said clamping device is sound-insulated from at least one of said first ring plate and said second ring plate by means of a soundproofing device.

17. A piezoelectric motor according to claim 16, wherein said soundproofing device is made of a soundproof material.

18. A piezoelectric motor according to claim 17, wherein said soundproofing device is made of rubber.

19. A piezoelectric motor according to claim 16, wherein said soundproofing device is made in the form of a thin-walled cylindrical membrane.

20. A piezoelectric motor according to claim 15, wherein said electrodes of said piezoelectric element are applied to flat surfaces of said piezoelectric element.

21. A piezoelectric motor according to claim 15, wherein said electrodes of said piezoelectric element are applied to cylindrical surfaces of said piezoelectric element.

22. A piezoelectric motor according to claim 15, wherein said rotor is in the shape of a barrel enclosed by said pusher plates.

23. A piezoelectric motor according to claim 15, wherein said rotor is in the shape of a cylinder enclosed by said pusher plates.

24. A piezoelectric motor according to claim 15, wherein said stator switches on said piezoelectric element.

25. A piezoelectric motor according to claim 15, wherein said rotor switches on the piezoelectric element.

* * * * *